Oct. 23, 1951 F. R. PERRY Re. 23,422

CLEANING METHOD AND MATERIAL THEREFOR

Original Filed April 14, 1944

INVENTOR.

Frank R. Perry

BY

Atty.

Reissued Oct. 23, 1951

Re. 23,422

UNITED STATES PATENT OFFICE 23,422

CLEANING METHOD AND MATERIAL THEREFOR

Frank R. Perry, Los Angeles, Calif., assignor to Turco Products, Inc., Los Angeles, Calif., a corporation of California Original No. 2,421,806, dated June 10, 1947, Serial No. 530,983, April 14, 1944. Application for reissue January 25, 1951, Serial No. 207,679

11 Claims. (Cl. 51—282)

Matter enclosed in heavy brackets [ ] appears in the original patent but forms no part of this reissue specification; matter printed in italics indicates the additions made by reissue.

My present invention relates to method and apparatus for cleaning by abrasives and to novel materials therefor.

The pistons, cylinders and other parts of internal combustion engines, for instance, become covered with adhering carbonaceous deposits which must be removed and which chemical solvents, vapor cleaners and mild alkali sprays are incapable of completely removing. Since many of such parts are usually made of aluminum alloys, strong alkali or acid solutions cannot be used upon them. While sand blasting is capable of removing such deposits, it cannot be safely employed because it produces surface pits and roughness which destroy the usefulness of the parts. Thus it has been necessary to remove such deposits by hand scraping and rubbing with abrasive wools and cloths, which operations are impracticable because of the length of time required to carry them out.

I have heretofore proposed the use, in air blast equipment, of small particles of starch killed dehydrated cereal grains, and while that material is effective in that it provides an effective cleaning operation, it is relatively expensive in that the grain must be first specially treated and in that the particles quickly become so pulverulent or powdered that they are ineffective as an abrasive.

I have found that I can produce a highly efficient cleaning operation by utilizing, in an air blast, a hard nut shell ground or cracked into particles of relatively small size. More particularly I have found that black walnut shells ground or cracked into relatively small particles to be peculiarly suitable in that such material is relatively inexpensive, plentiful as waste, is not sufficiently hard to pit or roughen metal surfaces, although it is hard enough to produce an effective cleaning operation. Such particles also last through a large number of cleaning operations and produce substantially no dust.

It is therefore one of the principal objects of my present invention to provide a novel method of removing carbonaceous deposits from metal.

Another object is to provide a new and efficient abrasive cleaning material.

Another object is to provide a cleaning method and material using ground or cracked black walnut shells or equivalent materials.

A still further object is to provide a novel apparatus for cleaning by air blasting.

By way of explaining my invention, I shall now describe a particular embodiment thereof, although the invention in its broader aspects is not to be confined to the details to be described since in its broader aspects as defined by the accompanying claims it is susceptible of being modified in manners which the following description will suggest to those skilled in the art.

For purposes of the following description I shall refer to the accompanying drawings, in which.

Figure 1:
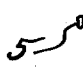
Fig. 1 illustrates in perspective some of the abrasive particles.
Figure 2:
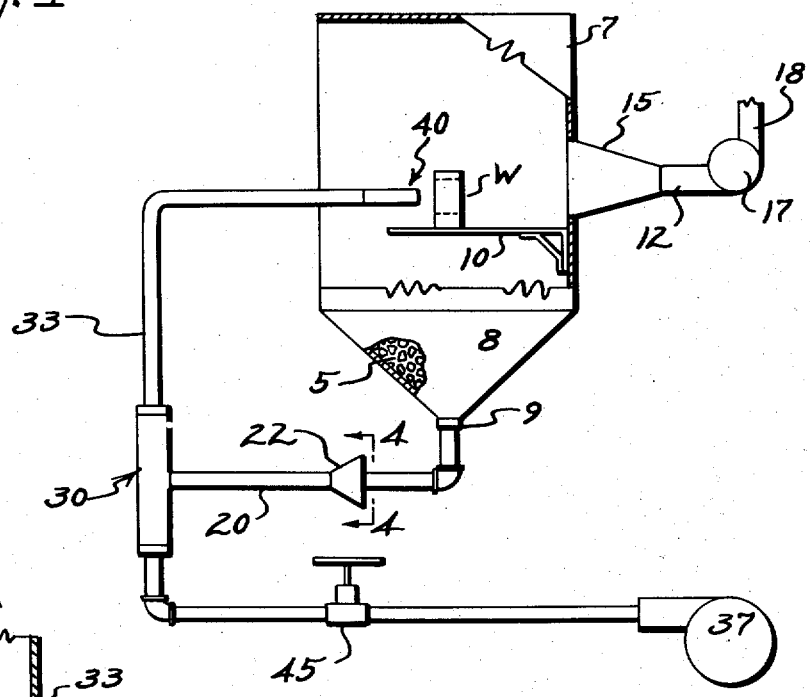
Fig. 2 is a side elevation, partly broken away, of an apparatus embodying my invention.
Figure 3:
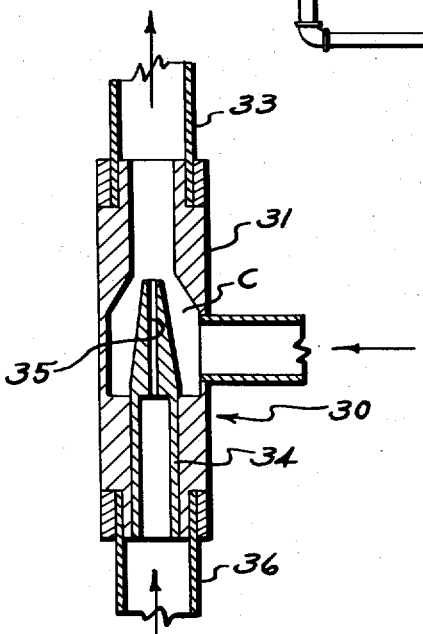
Fig. 3 is an enlarged longitudinal section of the mixing element.

In the drawing, Fig. 1, I show granules or pellets 5, formed by grinding or cracking the dried shells of black walnuts. While the size of the pellets may be varied somewhat, it is desirable that they be cracked or ground in such manner as to present relatively sharp edges and to a 10–30 mesh screen size, an optimum size being 10–15 mesh.

In carrying out my operation I prefer to utilize apparatus comprising a cabinet 7 open at its front and having bottom walls 8 which converge to an outlet neck 9. A work-supporting bracket 10 may be secured in the cabinet and a suction conduit 12 communicates with the interior of the cabinet at a point adjacent the bracket 10 through a flaring portion 15. Conduit 12 communicates with the intake of a suction fan 17 of conventional construction and the discharge outlet 18 from the fan leads to a waste depository not shown.

Figure 4:
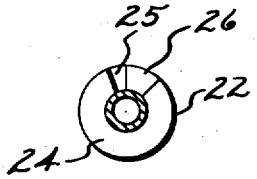
Fig. 4 is an enlarged section taken on line 4—4 of Fig. 2.
Figure 5:
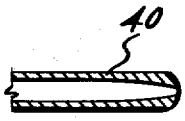
Fig. 5 is a fragmentary enlarged section of the discharge end of the nozzle element.

A conduit 20 has its inlet neck communicating with the outlet end of neck 9 through a damper member 22 to admit air to the conduit. As best shown in Fig. 4, the member 22 has a wall 24 provided with an opening 25 and adapted to be open and closed by rotatable damper 26.

The outlet end of conduit 20 communicates with a suction chamber C in a mixing chamber 30. The mixing member comprises a tubular medial portion 31 having a reduced diameter discharge end to receive a flexible hose 33. A nipple 34 extends into the inlet end of the member 30, having a restricted discharge passage 35 communicating with the bore of member 30 at one end of chamber C, so that air under pressure discharged through nipple 34 from a hose 36 communicating with a conventional compressor 37 will create a vacuum in chamber C to draw the abrasive particles into the air line. A nozzle 40 is secured on the discharge end of the hose 33.

My cleaning method is carried out and the apparatus operates as follows:

A supply of pellets 5 is placed in the bottom portion of cabinet 7 and the article to be cleaned, here designated W, is placed upon the bracket 10 or it may be merely manually held in the cabinet. By opening the valve 45 controlling line 36, a stream of air under pressure passes from the compressor and is discharged onto the work W through nozzle 40. The vacuum created in chamber C draws the desired quantity of the pellets 5 through line 20 into the air stream, which pellets are projected against the work W with the force of the air stream. The quantity of pellets introduced to the air stream depends, of course, upon the air pressure and upon the degree of opening of the damper 26. The pellets being relatively light in weight, too great a quantity of them would be drawn into the air stream if the damper were completely closed, and yet a sufficient air pressure must be used to project the pellets against the work with suitable abrasive force.

My apparatus is, of course, suitable for carrying out a cleaning operation wherein other types of pulverized abrasives are used which may be susceptible of being broken up into powder or dust form by impact with the work. Even with the use of pellets formed of ground or cracked dried black walnut shells some relatively small fragments will be broken off the main pellet form, which fragments are too small to be useful and which should not be permitted to return to the storage supply of the pellets in the lower part of the cabinet. Thus, to prevent any powdered material from being returned to the main pellet supply in the lower part of the cabinet, I provide conduit 12 and suction fan 17, which fan will draw off any powdered material which does not readily drop into the lower part of the cabinet by gravity against the action of the suction fan, so that all pellets in the lower part of the cabinet are maintained of suitable size for efficient operation.

Pellets formed of cracked or ground dried nut shells, while sufficiently hard to remove carbonaceous deposits from metal, are sufficiently resilient that they do not pit or indent the metal. While I have found ground or cracked black walnut shells to be preferable, my invention in its broader aspects contemplates the use of pellets of other types of ground or cracked nut shells having equivalent characteristics.

I claim:

1. The method of cleaning metal articles which consists of projecting thereagainst a stream of fluid under pressure carrying, in suspension therein, pelletized nut shells having the hardness of black walnut shells.

2. The method of cleaning metal articles which consists of projecting thereagainst a stream of fluid under pressure carrying, in suspension therein, pelletized black walnut shells.

3. An abrasive material for use in air blasts for cleaning metal comprising pelletized nut shells having the hardness of black walnut shells.

4. An abrasive material for use in air blasts for cleaning metal comprising pelletized black walnut shells.

*5. The method of cleaning metal articles which consists of projecting thereagainst a stream of fluid under pressure carrying, in suspension therein, pelletized nut shells, having the hardness of black walnut shells, ground to a screen size of 10–30 mesh.*

*6. The method of cleaning metal articles which consists of projecting thereagainst a stream of fluid under pressure carrying, in suspension therein, pelletized nut shells, having the hardness of black walnut shells, ground to a screen size of 10–15 mesh.*

*7. The method of cleaning metal articles which consists of projecting thereagainst a stream of fluid under pressure carrying, in suspension therein, pelletized black walnut shells having a screen size of 10–30 mesh.*

*8. The method of cleaning metal articles which consists of projecting thereagainst a stream of fluid under pressure carrying, in suspension therein, pelletized black walnut shells having a screen size of 10–15 mesh.*

*9. An abrasive material for use in air blasts for cleaning metal comprising pelletized nut shells presenting relatively sharp edges and having the hardness of black walnut shells, and having a screen size of 10–30 mesh.*

*10. An abrasive material for use in air blasts for cleaning metal comprising pelletized black walnut shells having a screen size of 10–30 mesh.*

*11. An abrasive material for use in air blasts for cleaning metal comprising pelletized black walnut shells having a screen size of 10–15 mesh.*

FRANK R. PERRY.

REFERENCES CITED

The following references are of record in the file of this patent or the original patent:

UNITED STATES PATENTS

| Number | Name | Date |
|---|---|---|
| 1,184,894 | Taylor | May 30, 1916 |
| 1,884,791 | McCrery | Oct. 25, 1932 |
| 1,885,760 | Peik | Nov. 1, 1932 |
| 2,062,671 | Lupo | Dec. 1, 1936 |
| 2,114,573 | Rhodes | Apr. 19, 1938 |
| 2,176,577 | Tirrell | Oct. 17, 1939 |
| 2,185,262 | Lupo | Jan. 2, 1940 |
| 2,271,537 | Biggert | Feb. 3, 1942 |
| 2,318,578 | Balz et al. | May 11, 1943 |
| 2,332,251 | Parrish | Oct. 19, 1943 |